United States Patent [19]
Ursworth et al.

[11] Patent Number: 5,510,687
[45] Date of Patent: Apr. 23, 1996

[54] ELECTRIC MOTOR CONTROLLER WITH TEMPERATURE PROTECTION

[75] Inventors: Peter Ursworth, Lewes, England; Abdullah Inuwa, Kano, Nigeria

[73] Assignee: Allen-Bradley Company, Inc., Milwaukee, Wis.

[21] Appl. No.: 235,048

[22] Filed: Apr. 29, 1994

[51] Int. Cl.$^6$ .................................................. H02P 1/24
[52] U.S. Cl. .................. 318/727; 318/806; 318/798; 318/471; 318/490
[58] Field of Search ................................ 318/727, 806, 318/798, 783, 471, 490, 798–815

[56] References Cited

U.S. PATENT DOCUMENTS

| | | | |
|---|---|---|---|
| 1,728,803 | 9/1929 | Palmer . | |
| 1,952,072 | 3/1934 | Jewell | 171/95 |
| 2,825,027 | 2/1958 | Seely | 324/62 |
| 2,912,644 | 11/1959 | Makous | 324/62 |
| 3,195,044 | 7/1965 | Flanagan | 324/62 |
| 3,207,980 | 9/1965 | Shockroo et al. | 324/62 |
| 3,769,576 | 10/1973 | Norkaitis | 324/51 |
| 4,083,001 | 4/1978 | Paice | 324/158 |
| 4,453,122 | 6/1984 | Johnson et al. | 318/806 |
| 4,829,234 | 5/1989 | Gretsch | 324/62 |
| 4,897,584 | 1/1990 | Grutzmacher et al. | 318/471 |

FOREIGN PATENT DOCUMENTS

| | | | |
|---|---|---|---|
| 53-28212 | 3/1978 | Japan | H02K 11/00 |
| 53-28211 | 3/1978 | Japan | H02K 11/00 |

*Primary Examiner*—William M. Shoop, Jr.
*Assistant Examiner*—Karen Masih
*Attorney, Agent, or Firm*—Mark W. Pfeiffer; John M. Miller; John J. Horn

[57] ABSTRACT

An electric motor has three windings which are supplied by a three-phase source of electricity that has one polarity during a first half-cycle and another polarity during a second half-cycle. The motor is controlled by an apparatus that has three thyristor switches coupling the phases of the source to the motor windings. A switch controller triggers the thyristor switches to apply electricity that produces movement of the motor. One thyristor switch is operated to be in a first non-conductive state during a portion of every first half-cycle and in a second non-conductive state during a portion of every second half-cycle. The first non-conductive states are longer in duration than the second non-conductive states. A current sensor provides a first value that indicates the magnitude of the DC component of electric current flowing through one motor winding that is connected to the one switch. A voltage sensor provides a second value that indicates the magnitude of the DC component of voltage across the one motor winding. The resistance of the one motor winding is determined from the first and second values and the resistance is used to calculate the temperature of the motor. Should the temperature reach a maximum operating temperature, the triggering of the thyristor switches ceases thereby bringing the motor to a stop.

17 Claims, 5 Drawing Sheets

ELECTRIC MOTOR CONTROLLER WITH TEMPERATURE PROTECTION

BACKGROUND OF THE INVENTION

The present invention relates apparatus for controlling the operation of an electric motor; and particularly to such apparatus which protect the motor against over heating.

Today, most industrial motors of one horsepower or larger are three-phase induction motors. These devices typically run very close to their thermal limits in order to achieve higher specific outputs. Thus, the user requires a finer degree of protection to avoid unnecessary Shutdowns and production loss. Adequate protection of these motors can be achieved through systems designed to detect overload, short-circuits, and phase-to-phase faults.

Overloading is the most common cause of motor failure but only if the overloading is sustained. A sustained overload condition can cause serious and continuous temperature build-up within the motor winding which shortens the life of insulation and can ultimately result in complete burn-out. Conventional overload protection has involved the use of electromagnetic overload relays or thermal overload relays. These are current operated devices which have inverse characteristics that may differ considerably from the thermal characteristics of the motor and its surroundings. To be an effective safeguard, prediction devices should not only match the heating characteristics of the motor, but also its cooling characteristics. These desirable characteristics are more nearly met in thermal overload relays, but unfortunately the heating and cooling characteristics of many motor designs are so diverse as to make it nearly impossible to provide a single thermal relay to match them.

Electronic motor protection devices have more recently been introduced. These devices use electrical resistance-capacitance (RC) analog to simulate the heating conditions of a motor. In the RC thermal model, heat flowing into the motor from conductor and core losses is represented by a current source in the equivalent circuit. The resistance R represents the motor's thermal resistance and the capacitance C represents the motor's thermal capacitance. Digital circuits and microprocessors have been employed to perform the protection function in a manner similar to the previous analog devices and in addition provide a range of other protection functions. Electronic protection devices are designed to be applicable to a wide range of machine ratings, and facilities and provided to match the protection characteristics to the installed motor. Such conventional overload protection devices assume effective ventilation of the motor. If an air inlet becomes blocked through non-maintenance, the motor may overheat even though the voltage and current levels applied to the motor are normal. In addition, when the motor and its protection device are situated in locations with different ambient temperatures, the protection device may fail to register overheating that results from high ambient temperature at the motor.

It is generally argued that overload protection should take the form of devices that provide a direct indication of winding temperature and which ignore current loading. The basis of this argument is that full use can then be made of an inherent overload capacity a motor may have; particularly under cyclic conditions, but with the knowledge that the motor is protected against overheating and possible burn-out. This argument can be resolved by installing temperature detectors, such as thermistors, in the motor's winding during manufacture. This method is known to be costly and involves additional wiring and installation expense.

A number of indirect techniques have been developed to measure the temperature of motor windings while the motor is in operation. For example, U.S. Pat. No. 1,728,830 discloses a temperature indicating device for a dynamo-electric machine which comprises a plurality of resistors connected to the field-producing winding of the machine so that a Wheatstone bridge circuit is formed. An ammeter is connected to the galvanometer points on the bridge in order that the thermal condition of the winding can be ascertained by the change of resistance of the field producing winding.

U.S. Pat. No. 4,083,001 places an asymmetric resistance in series with the motor circuit. In particular, the asymmetric resistance device comprises two series diodes in parallel with a third diode in the opposite direction. The resistance of the motor winding is then determined from measurements of the direct current component and the corresponding voltage using a magnetic amplifier with a bias winding excited in response to the voltage of the asymmetric resistance and a control winding excited by the motor current. An indication is obtained when the current flows below a level that indicates a resistance corresponding to an overload temperature condition.

With the advent of microelectronic circuitry, microprocessor based control circuits, such as the one disclosed in U.S. Pat. No. 4,996,470, have been developed to start and stop a motor. Specifically, the microprocessor controls the times at which thyristor switches are triggered to vary the amount of time during each cycle of the alternating supply current that the switches are conductive. This varies the amount of electricity applied to the motor. The zero crossings of the a.c. supply voltage for each phase is detected and the corresponding thyristor switch is triggered after a defined delay period. The amount of delay at which the thyristors are triggered is varied to control the magnitude of the voltage applied to the motor. For example, when the motor is started, a relatively long delay can be utilized which is then gradually decreased to apply progressively more electricity and increase the motor speed in a controlled fashion. The inverse operation can be employed to downwardly ramp the speed of the motor to stop the motor in a controlled fashion. Since these types of motor controllers already provide sophisticated computational capacity, it is desirable to incorporate overload protection into such controllers.

SUMMARY OF THE INVENTION

A general object of the present invention is to provide a mechanism for detecting a thermal overload of an electric motor that is powered by a three-phase source of electricity.

Another object is to provide a technique by which the temperature of the motor can be determined during its operation from the characteristics of the electricity applied to drive the motor.

These objects are achieved by an apparatus in which three switches connect the motor to the electricity source. That apparatus operates the switches to apply electricity to the electric motor in a manner that produces movement of the motor. One switch is triggered to create a first non-conductive period during each positive half-cycle of the alternating electricity cycles and to create a second non-conductive period during each negative half-cycle. Unlike previous motor controllers, either the first or second non-conductive period is longer in duration than the other non-conductive period. Triggering one switch in this manner introduces a DC component into the alternating electricity applied to a motor winding that is connected to that one switch.

The DC component of the electric current flowing through that motor winding is sensed to produce a first value indicative of the magnitude of the DC component of that electric current. The DC component of the voltage across the motor winding also is sensed to produce a second value indicative of a magnitude of the DC component of the voltage. The first and second values are employed to derive the resistance of the motor winding and the temperature of the motor is calculated from the resistance. When the temperature reaches a thermal limit, triggering of the switches is altered to prevent damage to the motor. For example, the motor can be turned off to allow cooling.

A further object of the present invention is to provide a mechanism by which the temperature of the motor continues to be sensed after the triggering has been altered. This enables normal operation of the motor to resume automatically upon the motor cooling to a given temperature.

DETAILED DESCRIPTION OF THE INVENTION

Figure 1:
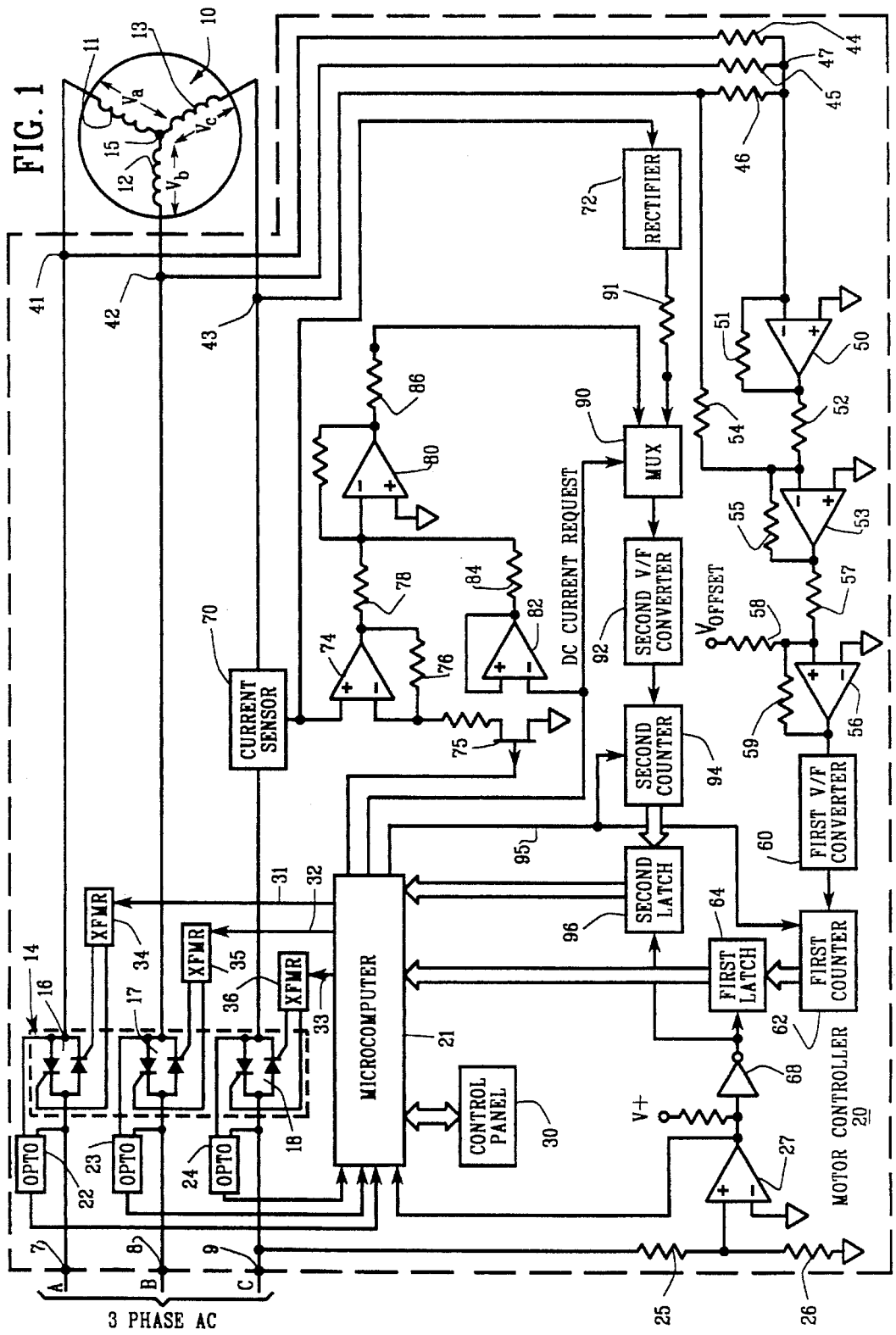
FIG. 1 is a schematic diagram illustrating an electric motor and a motor controller for practicing the present invention.

With initial reference to FIG. 1, a three-phase electric motor 10 has three stator windings 11, 12 and 13 connected in a Y about a neutral node 15, however present invention also has application motors with delta connected windings. The application of electricity to the motor 10 is regulated by a motor controller 20 and its thyristor switch module 14. The switch module 14 includes three pairs of SCR's 16, 17, and 18 with the SCR's in each pair connected in an inverse-parallel relationship. Each SCR pair forms a bidirectional thyristor switch which couples one of the stator windings 11, 12 or 13 to a supply line terminal 7, 8 or 9 for phases A, B, or C from a source of three-phase alternating electricity. The voltage across each pair combination of supply phases has a frequency of 50 Hz. or 60 Hz.

The SCR pairs 16–18 are triggered, or fired, by the motor controller 20 that includes a microcomputer 21 and three electro-optic (opto) couplers 22, 23, and 24. The electro-optic couplers 22–24 inputs are connected across each of the SCR pairs and emit an active output signal when the associated SCR pair turns off as occurs when the current through the SCR pair reaches zero. The outputs of the electro-optic couplers are connected to inputs of the microcomputer 21. The phase C supply line is coupled by a voltage divider consisting of resistors 25 and 26 to the circuit ground of the motor controller 20. The node between resistors 25 and 26 is connected to the inverting input of a comparator 27 that has its non-inverting input connected to circuit ground. Comparator 27 acts as a detector of the zero crossings of the phase C voltage Vc. The output signal of the comparator 27, which indicates the zero voltage crossings, is applied to another input of the microcomputer 21.

The microcomputer 21 may be a 680 model sold by Hitachi America, Ltd., which contains a microprocessor, timer circuits, a read only memory, and a random access memory in the same integrated circuit package. A control panel 30 is coupled to the microcomputer to receive commands from an operator and display operating information.

A computer program which defines the operation of the motor controller 20 is stored in the microcomputer's internal read only memory. This program is similar to those used with conventional programmable motor controllers insofar as the general functions of starting, stopping and operating the motor 10 at a normal running speed. In performing the control functions, microcomputer 21 responds to the zero voltage crossing signal from comparator 27 and the zero current signals from electro-optic couplers 22–24 by generating properly timed SCR trigger signals on three lines 31, 32, and 33 of a parallel output port. The first output line 31 is coupled by a first conventional isolation transformer 34 to the gate terminals of the first pair of SCR's 16 for electricity phase A. The other trigger signal output lines 27 and 28 are coupled by similar isolation transformers 35 and 36 to the gate terminals of the second and third SCR pairs 17 and 18, respectively, for electricity phases B and C.

The circuit of the motor controller 20 described thus far is typical of many prior controllers which detected the zero crossing of the alternating electricity in the three phase supply and controlled the thyristors triggering to apply the appropriate amount of current to the motor 10. Additional circuitry and software have been added to the motor controller to enable it to measure the temperature of the motor 10 and detect when a thermal overload condition exists. As will be described, the microcomputer 21 responds to the occurrence of a thermal overload by altering the application of electricity in order to protect the motor from serious damage.

The additional circuitry for this improvement measures the voltage and current through one winding of the motor. In order to measure the voltage across winding 13, the three output terminals 41, 42 and 43, at which the stator windings 11, 12 and 13 are connected to the motor controller 20, also are connected to three equal value resistors 44, 45 and 46, respectively, in a Y connection having a common node 47. The three resistors 44–46 enable the measurement of the voltage across the C phase stator winding 13 by adding the three phase voltages to provide an output that is proportional to the negative of the neutral voltage at the motor neutral point 15.

A first operational amplifier (op amp) 50 has an inverting input connected to the common node 47 and the non-inverting input connected to circuit ground. A feedback resistor 51 couples the non-inverting input to the output of operational amplifier 50. The output of the first operational amplifier 50 is coupled by resistor 52 to the inverting input of a second operational amplifier 53 which has its non-inverting input connected to circuit ground. A drop-down resistor 54 couples motor terminal 43 for the third stator winding 13 to the inverting input of the second operational amplifier 53. A feedback resistor 55 is coupled between the inverting input and the output of the second operational amplifier. The second operational amplifier 53 adds a voltage which is proportional to the phase C motor terminal voltage to the neutral voltage level provided at the output of first operational amplifier 50. Thus, the second operational amplifier 53 produces an output voltage that is proportional to the voltage across the third stator winding 13 of the motor 10.

The process by which the resistance of the third stator winding 13 is measured involves introducing a DC component to the voltage across that winding. The percentage of the DC voltage component typically is relatively small compared to the entire voltage across the third stator winding. Consequently, a circuit offset voltage of a few millivolts introduces a non-trivial percentage error. As a solution a fixed DC voltage $V_{offset}$ is added by a third operational amplifier 56 to produce a positive output voltage regardless of the sign of the output of the second operational amplifier 53. Specifically, the output of the second operational amplifier 53 is connected by resistor 57 to the non-inverting input of the third operational amplifier 56. A positive offset voltage is applied via resistor 58 to the non-inverting input of third operational amplifier 56 and a feedback resistor 59 is provided between that input and the operational amplifier output. The inverting input of the third operational amplifier 56 is connected directly to ground.

The output of the third operational amplifier 56 is coupled to the input of a first voltage-to-frequency (V/F) converter 60 which produces an output signal having a frequency that is proportional to the voltage level of the output signal from the third operational amplifier 56. The converter 60 is configured for a full scale frequency of 500 KHz. The output signal from the first voltage-to-frequency converter 60 is coupled to the input of a first sixteen-bit binary counter 62 which counts the cycles of that signal. The binary output count from the first counter 62 is applied to the input of a first set of data latches 64. When the first set of data latches 64 is enabled, the count from the first counter 62 is stored within the latches. The enable input to the first set of latches receives the inverted phase C voltage zero crossing signal produced by inverter 68 coupled to comparator 27. Thus the first set of latches 64 are enabled during the positive half-cycle of the phase C voltage, and holds the count during the negative half-cycle. The output of the first set of latches 64 is applied to a parallel input port of microcomputer 24. This enables the microcomputer 21 to read a binary count from the first latch 64 which corresponds to the average voltage across the third motor winding 13, offset by the effect of the voltage $V_{offset}$.

The motor controller 20 also includes circuitry for measuring the DC current component and the RMS current through the third stator winding 13. To this end, a Hall-effect current sensor 70 is connected in phase C between the switch module 14 and output terminal 43. This sensor 70 converts the phase C current to a proportional output voltage which is fed to a gain circuit 74 and a rectifier 72. The gain circuit provides an output signal representing the DC current component and comprises a non-inverting amplifier formed by a fourth operational amplifier 74. The fourth operational amplifier 74 is designed to give a gain of four when the motor is running below twice its full load current (FLC) as specified by the motor manufacturer. This is achieved by the microcomputer 21 turning on an FET 75 which connects the inverting input of operational amplifier 74 to ground via resistor 76. When the FET is on, its low conductive state resistance introduces resistor 76 into the circuit and the gain of the amplifier becomes four. When the motor is running at two times FLC or more, the gain of operational amplifier 74 is set equal to one by turning off the FET. In this state, the drain-source resistance $R_{off}$ is typically more than 10,000 megaohms which causes operational amplifier 74 to behave as a voltage follower with a gain of one.

The output of the fourth operational amplifier 74 is connected by resistor 78 to the inverting input of a fifth operational amplifier 80 having its non-inverting input connected to ground. The fifth operational amplifier 80 is part of a current signal shift circuit similar to the one utilized with respect to the voltage signal. Specifically, the shift circuit ensures that the current signal will always be positive regardless of the positive and negative excursions of the current as sensed by device 70. The offset voltage is supplied from the output of microcomputer 21 which produces a signal designated DC CURRENT REQUEST, when the DC current component is to be measured. This offset signal is applied through a follower operational amplifier 82 that is connected by resistor 84 to the non-inverting input of the fifth operational amplifier 80. It should be noted that when the DC CURRENT REQUEST is not at a high logic level, the voltage on this portion of the current sensing channel is not offset. The output of the fifth operational amplifier 80 is a voltage level which corresponds to the current supplied by phase C to the motor 10. This output voltage is coupled by resistor 86 to an input of a two-to-one multiplexer 90.

The other input to the multiplexer 90 is connected by a resistor 92 to the output of a rectifier circuit 72 which receives at its input the output from the current sensor 90. Component 72 is a unity gain full-wave precision rectifier.

The multiplexer responds to the DC CURRENT REQUEST signal from microcomputer 21 by selecting one of the two inputs to be applied to the multiplexer output, as will be described. The output of the multiplexer 90 is coupled to the input of a second voltage-to-frequency converter 92 which produces a signal that is applied to an input of a second sixteen-bit binary counter 94. The second counter 94, as well as the first counter 62, are reset by a signal on line 95 from the microcomputer 21. The count from the second counter 94 is stored in a second set of data latches during each negative half-cycle of the phase C voltage. The output of the second latch 96 is coupled to another port of the microcomputer 21 enabling the count representing the current magnitude to be read by the microcomputer.

Periodically, the microcomputer 21 selects the output of rectifier 72 to obtain a value from the second set of data latches 96 which corresponds to average rectified phase C current. From this measurement the equivalent RMS current is derived and compared to the motor's rated full load current to determine the gain for the fourth operational amplifier 74. For example, the technique described in U.S. Pat. No. 5,153,489 can be employed to derive the equivalent RMS current value and that description is incorporated herein by reference.

The motor controller 20 measures the resistance of the third stator winding 13 by introducing a DC component to the current in that winding. The percentage of the DC voltage component typically is relatively small compared to the entire voltage across the third stator winding. As a consequence a circuit offset voltage of a few millivolts introduces a non-trivial percentage error. Periodically, the offset voltage is measured and a compensation factor is derived. The motor 10 is operated by triggering the SCR pairs 16–18 to produce equal periods of conductivity during the positive and negative half-cycles of the voltage in each supply phase A, B, and C. This operation does not introduce a DC component into the motor current or voltage. Therefore at this time, the counters 62 and 94 produce a set of count values which represent the magnitude of the circuit offset errors, which require compensation. Later, when voltage and current are being measured to determine the resistance of stator winding 13, as will be described, this set of count values is subtracted from the counts produced by counters 62 and 94 thereby cancelling the offset effect.

During normal operation of the motor controller 20, the microcomputer 21 periodically senses the direct current components of the motor's phase voltage and current. These direct current (DC) components result from intentionally unbalancing the non-conducting periods of the SCR pair 18 connected to the motor's supply phase C. Although the embodiment being described senses the phase C parameters, either one of the other electrical phases could be used as an alternative. To get the DC components, the unbalanced phase voltage and current are integrated over an exact integral number of electrical cycles (e.g. 30 cycles). The stator winding resistance is determined by dividing the DC voltage component by the DC current component. From this resistance measurement, the motor stator winding temperature can be computed. This temperature then can be compared to temperature limit for this class of motor to determine when a thermal overload is occurring.

In order to calculate the temperature during operation of the motor 10, a reference value for the stator winding resistance $R_0$ at a known temperature $TEMP_0$ must be determined first. This determination is carried out during a calibration phase of operation prior to placing the motor in operation. When the motor controller 120 is installed, the operator enters, via control panel 30, parameters defining the characteristics of the particular motor 10 being controlled. These parameters include the class of motor which is a standard motor designation based upon the type of insulation utilized and the motor's specified upper temperature limit. The microcomputer 21 has a look-up table stored in its internal read only memory which contains the thermal limit for each class of motor. After storing the motor class, the operator also inserts the motor's rated full load current (FLC).

Figure 2A:
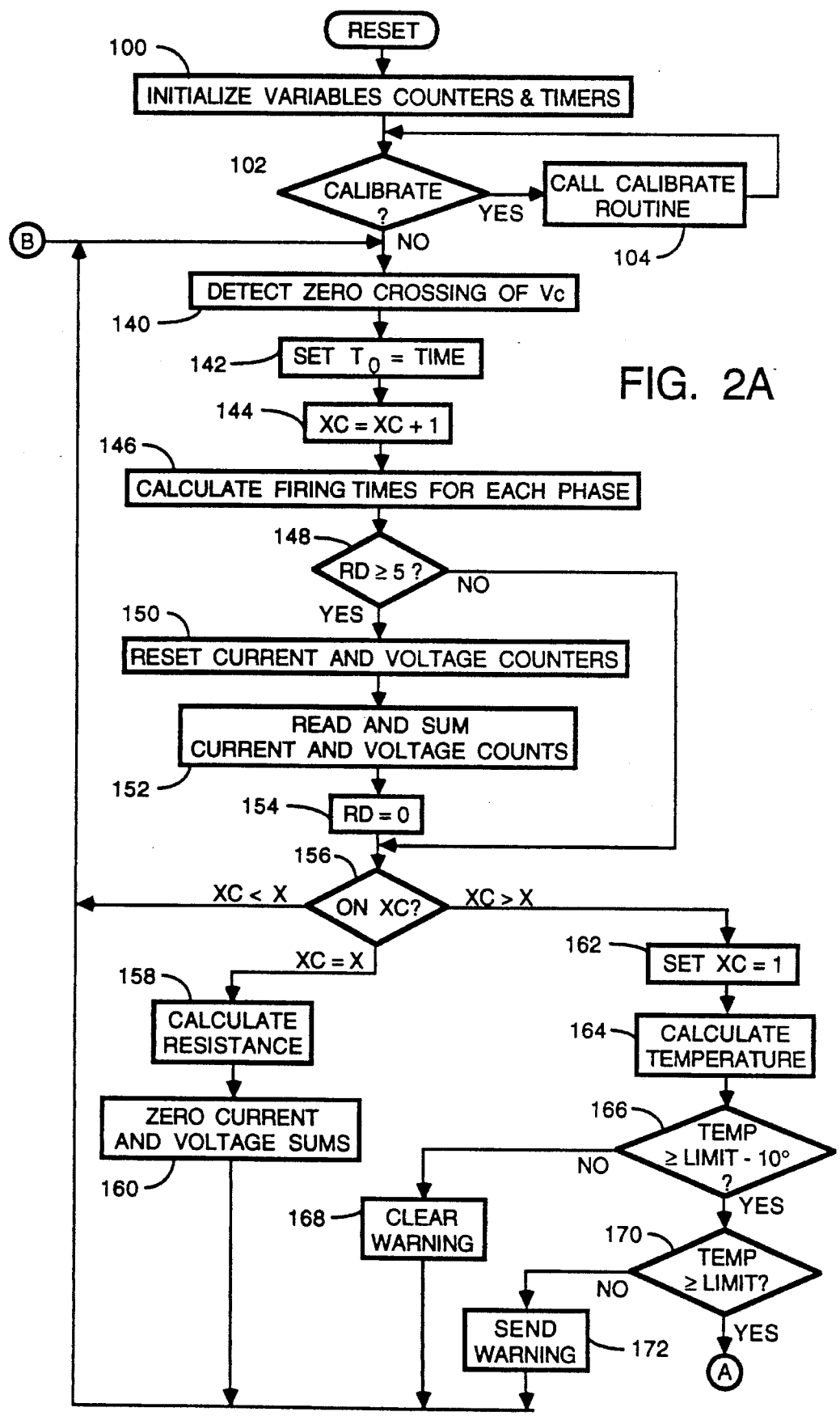
FIGS. 2A and 2B are flowcharts of the portion of the program that is executed by the motor controller to provide thermal overload protection.

The operator then presses the reset button on the control panel 30. This causes the microcomputer 20 to begin executing the motor control program shown in FIG. 2A. Upon being reset, the motor control program at step 100 initializes variables, counters and timers utilized in the course of its operation. Then at step 102, a determination is made whether the operator is requesting a recalibration of the motor controller operation. The recalibration is requested by the operator pressing the appropriate push button on the control panel 30. Such recalibration occurs upon initial connection of the motor 10 to the controller 20 and at such other times as the operator may designate. When calibration is called for, the program execution branches to step 104 where a calibration routine is called by the microcomputer 21.

Figure 3:
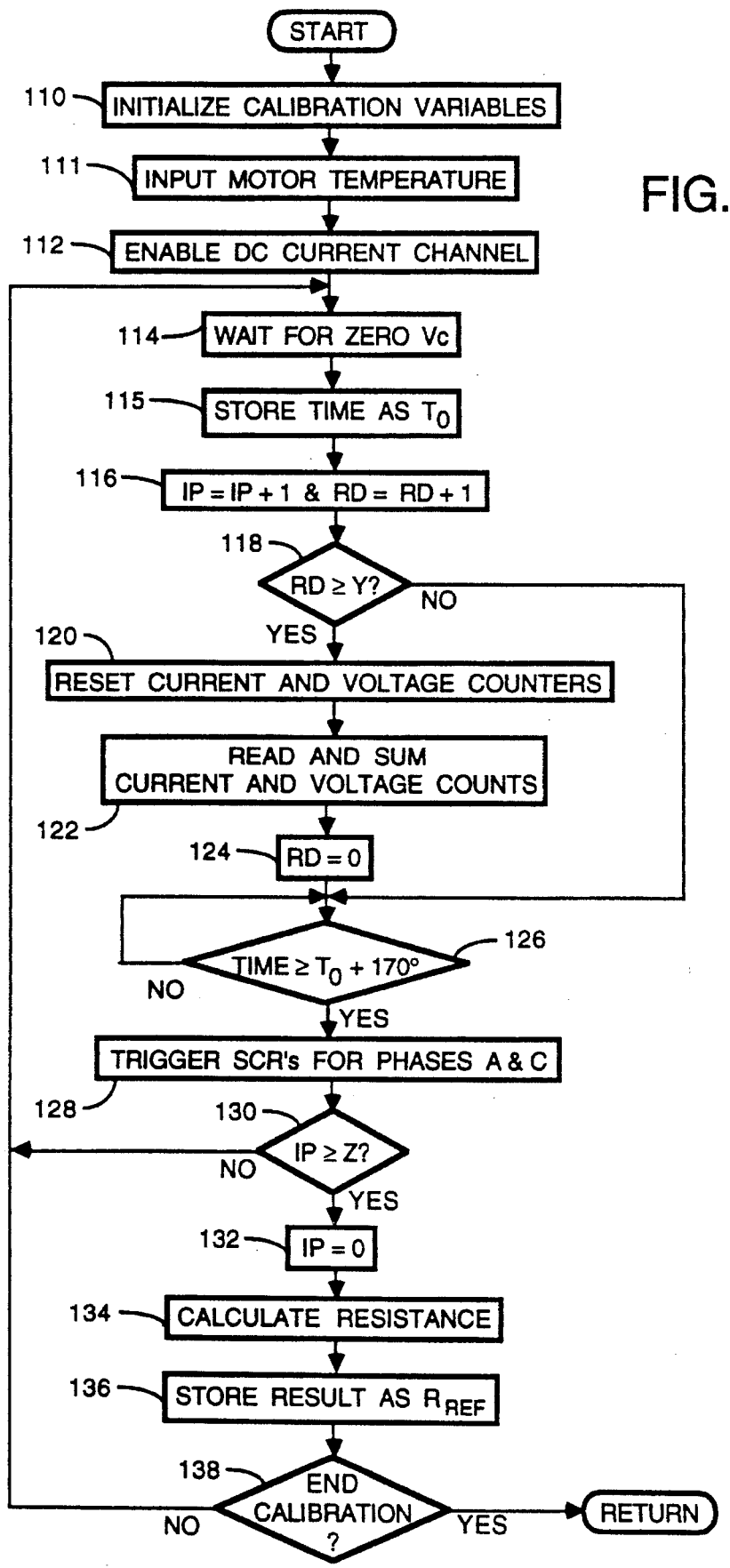
FIG. 3 is a flowchart of a calibration subroutine called from the program depicted in FIG. 2A.

With reference to FIG. 3, the calibration routine commences at step 110 with the initialization of variables utilized during the calibration process. At step 111, the operator enters the present temperature of the motor 10 into the microcomputer 21 via control panel 30. This temperature is measured by the operator applying a thermometer to the motor 10 after a period of non-use that is sufficiently long to ensure a uniform temperature throughout the motor. The entered value is stored as a reference temperature $TEMP_0$. The program execution then advances to step 112 where the microcomputer 21 issues an active DC CURRENT REQUEST signal to enable the current gain circuit and apply the output of its operational amplifier 80 via the multiplexer 90 to the second voltage-to-frequency converter 92. At the same time, the two counters 62 and 94 are reset. Then at step 114, the calibration routine waits for an indication from the comparator 27 that the phase C voltage Vc has made a zero crossing. Upon that occurrence, the time indicated by the clock of the microcomputer 21 is stored as time $T_0$ at step 115.

As previously noted the voltage and current values are integrated over a number of cycles of the supply voltage (e.g. 50). This integration period is specified in terms of a number of half-cycles by the value of a variable designated IP. The first and second counters 62 and 94 are not large enough to count all of the cycles of the signal from converters 60 and 92 during the entire integration period. As a consequence, the counters are periodically read every five cycles by the microcomputer 21 which keeps separate running summations of voltage and current counts read during the integration period. The count of half-cycles during each reading period is maintained by a variable designated RD. At step 116, variables IP and RD are incremented.

The calibration program advances to step 118 where a determination is made whether the count RD of supply voltage cycles equals the number Y at which the counters are to be read. When that is the case, the microcomputer resets the first and second counters 62 and 94 at step 120. The value of Y is selected so that the reading of counters will occur during the negative half-cycle of the supply voltage while the counts are held in the latches 64 and 96. Thus the resetting of the counters does not affect the latched values. Then at step 122 the latched voltage and current counts are read by the microcomputer 21, summed with the counts read previously during this integration period, and the results are stored in memory. Next the read cycle count RD is reset to zero at step 124.

Whether or not it is time to read the voltage and current counts, the program execution advances to step 126 where a determination is made whether it is time to apply a current pulse through stator winding 13 for resistance measurement purposes. This happens when the present time is indicated by the microcomputer's clock is greater than or equal to time $T_0$, at which the last zero voltage crossing occurred, plus the time interval equivalent to 170 degrees of the alternating current cycle. Until this time occurs, the program execution continues to loop through step 126. At the appropriate time, the SCR pairs 16 and 18 for phases A and C are triggered into conductive states at step 128. During calibration current is applied only through stator windings 11 and 13 so that the motor will not turn. The SCR's will return to a non-conductive state when the current through them reaches zero and remain non-conductive until triggered again.

The voltage and current measurements are integrated over a number of cycles Z. The number of supply voltage cycles occurring during the integration interval is indicated by the counter variable IP. At step 130, a determination is made whether the end of the integration period IP has occurred, i.e. IP≧Z. If the end of the integration period has not occurred, the program execution returns to step 112 to wait for another zero crossing of the phase C voltage Vc.

At the end of the integration period, the program execution branches from step 130 to step 132 where the integration period counter variable IP is reset to zero. Then at step 134, the resistance is calculated by dividing the counter sum representing the DC voltage component by the sum representing the DC current component. This resistance then is stored at step 136 in the microcomputer memory as a reference resistance value $R_0$ and an indication of the storage is provided on the control panel 30. The microcomputer 21 continues to execute the calibration routine until the operator indicates by the release of the calibration button on control panel 30 that the routine is to end. At that point, the execution branches from step 138 and returns to the main program shown in the flowchart of FIG. 1.

Referring once again to FIG. 1, upon completion of the calibration routine, the program enters a section where electricity is applied to produce movement of the motor. At step 140 the microcomputer waits until the comparator 27 indicates that a zero crossing of the phase C supply voltage Vc has occurred. The time at which the zero crossing occurs, as indicated by the clock within the microcomputer 21, is stored in memory as a variable designated $T_0$ at step 142. A zero crossing count designated Xc is then incremented at step 144.

The microcomputer 21 then calculates the trigger times for the SCR pairs 16–18 of each phase at step 146. The trigger times are expressed as a time interval from when the current through the respective SCR goes to zero. In the simplest version of a motor controller 20, these intervals are fixed once the motor 10 has achieved full operating speed. In more sophisticated controllers, such as the one disclosed in U.S. Pat. No. 5,008,608, the phase difference between the zero crossings of the voltage and current indicate a change in motor load and are used to adjust the thyristor trigger times accordingly.

Figure 4:
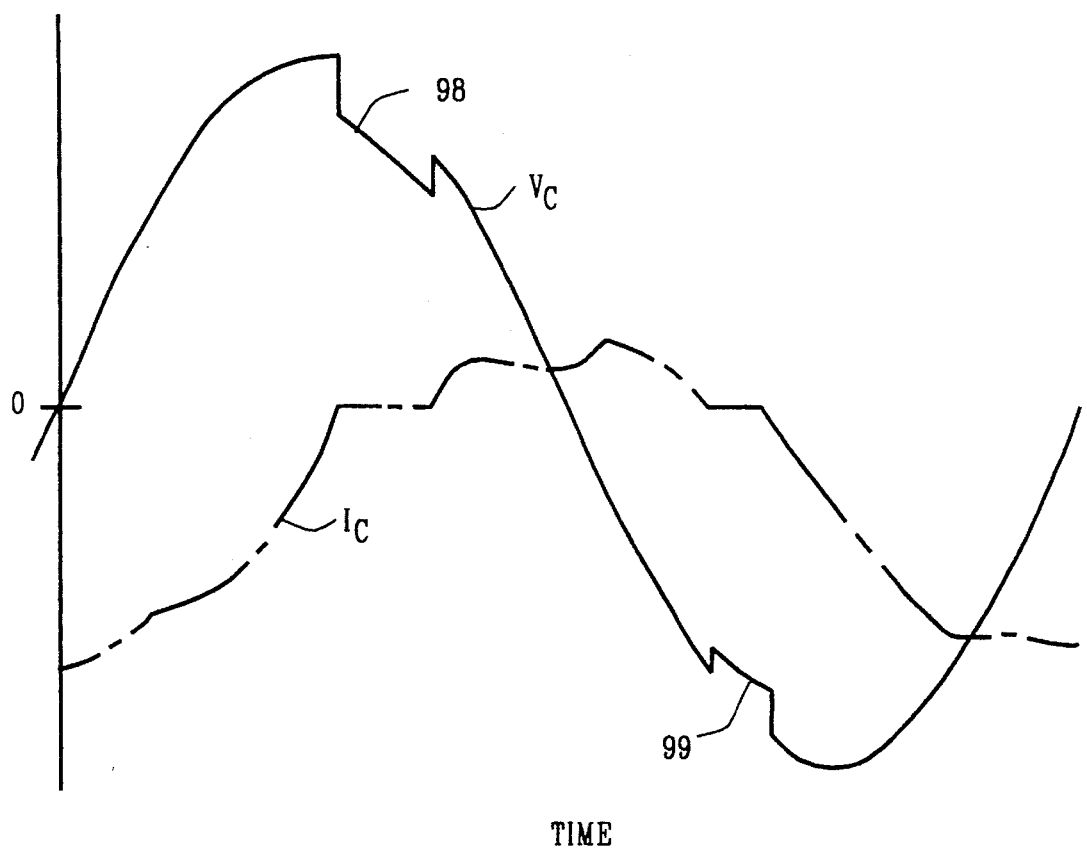
FIG. 4 is a graph of one phase of the motor voltage and current.

Regardless of the precise method by which the thyristor triggering times are calculated, a first phase angle delay is used to calculate the trigger time during each negative half-cycle of the voltage in phase C, while a second phase angle delay which is an additional fifteen degrees of phase angle delay longer than the first phase angle delay is used to compute the trigger time used during the positive half-cycle of that voltage. Since the SCR's are not triggered immediately when the current goes to zero, notches 98 and 99 are formed in the voltage waveform at motor terminal 43 during the time when the third pair of SCR's 18 is non-conductive, as shown in FIG. 4. It will be readily understood that the voltage at motor terminal 43 during these notches does not drop to zero due to the back emf voltage induced in the third winding 13 of motor 10. Because these notches 98 and 99 are unequal in duration, unequal amounts of electricity will be applied to the third stator winding during the negative and positive half-cycles. In the example shown in FIG. 4, since notch 98 during the positive half-cycle is wider, the current and voltage during that half-cycle will be less than during the negative half-cycle when the notch is narrower. However, in an alternative embodiment the notches in the negative half-cycles can be longer in duration than the positive half-cycle notches. This imbalance between half-cycles of the electricity applied to the motor introduces DC components of voltage and current in the third stator winding 13. These DC components enable the calculation of the resistance in the third winding 13 and the motor temperature.

The firing times calculated at step 146 are stored in memory for use by interrupt routines which trigger the SCR pairs 16–18. The SCR triggering routines are the same as those used in prior motor controllers of this type. Specifically, the electro-optic couplers 22–24 are each connected to an interrupt line of the microcomputer 21. Thus, the electro-optic coupler interrupts the microcomputer when the associated phase current makes a zero crossing. This interrupt causes the microcomputer 21 to load a software timer with the firing time delay interval calculated at step 146 for that particular phase. When this timer elapses, the microcomputer issues a trigger signal on the associated output line 31, 32 or 33 to trigger the SCR pair 14, 17 or 18, respectively for the supply phase in which the current made a zero crossing. Once the output signal has been issued, the interrupt routine terminates and the microcomputer 21 returns to the main program step which was executing at the time the interrupt occurred.

With reference again to FIG. 1, once the firing times have been calculated, the main program execution advances to a section in which a determination is made whether it is time to read the counts from the latches 64 and 96 which represent the voltage and current levels. As noted previously, the period of time over which these electrical parameters are integrated may be sufficiently long that the hardware counters 62 and 94 are unable to count the cycles of the signals from their respective voltage to frequency converters 60 and 94 during the entire integration period. Although it is possible to provide larger numerical counters, the present invention periodically reads the latched counts, separately sums the two counts with previous counts and resets the counter.

To accomplish this, the microcomputer 21 maintains a count designated RD which indicates the number of half-cycles of the phase C voltage which have occurred since the last time that the counters 62 and 94 were read. At step 148, the value of RD is inspected to determine if it equals or exceeds a number of half-cycles Y at which the counter values should be read again. When it is time to read the counters, the program execution advances to step 150 where the first and second counters 62 and 94 are reset by a pulse from the microcomputer on line 95. The resetting of the two counters does not affect the count values which were previously stored in the two latches 64 and 96. Then at step 152, the microcomputer reads the voltage count from the first latch 64, compensates for circuit offset errors, and sums that count with the previous counts read during the present integration period. The sum is stored in a memory location of the microcomputer. Similarly, the microcomputer 21 reads the current count from the second latch 96, compensates for circuit offset errors, and sums that value with the sum of the previous current counts read during the present integration period. The resultant sum is stored into another memory location. Once the counts have been read from the latches, the read counter variable RD is set to zero at step 154.

The length of the integration period is defined as a given number X of half-cycles of the phase C supply voltage. For example, X equals 60 for an integration period of 30 cycles of the phase C voltage. A variable designated XC counts the number of half-cycles of this supply voltage which occur during the integration period. The microcomputer 121 reads the value of variable XC at step 156 to determine which of several program branches to execute. When the count XC of phase C voltage half-cycles is less than X, the program execution returns to step 140 to await another zero crossing of that voltage. Otherwise when the half-cycle count XC equals X, the microcomputer 21 calculates the resistance of the third stator winding 13 at step 158. This calculation is performed by dividing the summation of the voltage counts by the summation of the current counts utilizing appropriate scaling factors to take into account differing signal gain factors in the voltage and current measuring circuits of controller 20. Then at step 160, the memory locations which contain the voltage and current sums are set to zero to sum the electrical parameter counts during another integration period.

While it may be possible to calculate both the resistance and the temperature during the same half-cycle of the supply voltage, since these are non-time critical tasks, their calculations have been divided over two supply voltage half-cycles in order that the calculation does not affect the primary motor control function of controller 20. Therefore, during the next half-cycle of the phase C supply voltage, the value of XC will exceed X and the program execution will branch from step 156 to step 162 where the value of the integration period half-cycle counter XC is set to one at to indicate that the present electricity cycle is the first one of a new integration period. Then at step 164 the temperature of the motor (TEMP) is calculated. In doing so, the following equation is solved:

$$\text{TEMP} = \text{TEMP}_0 + \frac{1}{\alpha R_0}(R_T - R_0)$$

where $R_0$ is the stator winding resistance measured during the calibration process, $\text{TEMP}_0$ is the temperature of the motor in degrees Celsius measured during calibration, $R_T$ is the stator resistance in ohms that was calculated at step 158 and $\alpha$ is the temperature coefficient of resistance in degrees $C^{-1}$.

Once the temperature of the motor 10 has been calculated, it is compared to the thermal limit for this class of motor. The user previously entered the class of the motor and the microcomputer 21 utilizes that motor class designation in accessing a look-up table stored within its read only memory to find the thermal limit for that class of motor. At step 166, the present motor temperature TEMP is compared to a value which is ten degrees below the thermal limit for the motor. If the temperature is below that value, the program execution branches to step 168 where the microcomputer 21 clears an output that is used to provide an indication that the motor 10 is approaching its thermal limit. In this manner, any previous warning issued by the microcomputer is negated when the temperature drops well below the thermal limit. However, if at step 166 the present temperature of the motor 10 is within ten degrees of the thermal limit, the program execution advances to step 170 where the temperature is compared to the full thermal limit value. If the temperature is within ten degrees of the thermal limit, the program branches to step 172 where the microcomputer 21 sends a warning signal to the control panel 30 to provide an indication to the user that the motor 10 is approaching its thermal limit as determined. Once the motor temperature reaches or exceeds the thermal limit at step 170, the program execution branches to a section where the SCR's 16–18 no longer are triggered thereby shutting off the motor 10.

At this point, the simplest version of the present invention, the motor controller 20 can simply go into a halted state where it remains until an operator presses a manual reset button on the control panel 30. However, in a more automated version of the present invention, the motor controller 20 can halt the triggering of the SCR's 16–18 thereby turning off the motor and then continue to monitor the motor temperature. When the controller determines that the motor has cooled sufficiently so that normal operation can resume, the execution of the control program returns to the section where the SCR's are being triggered to apply electricity to the motor.

Figure 2B:
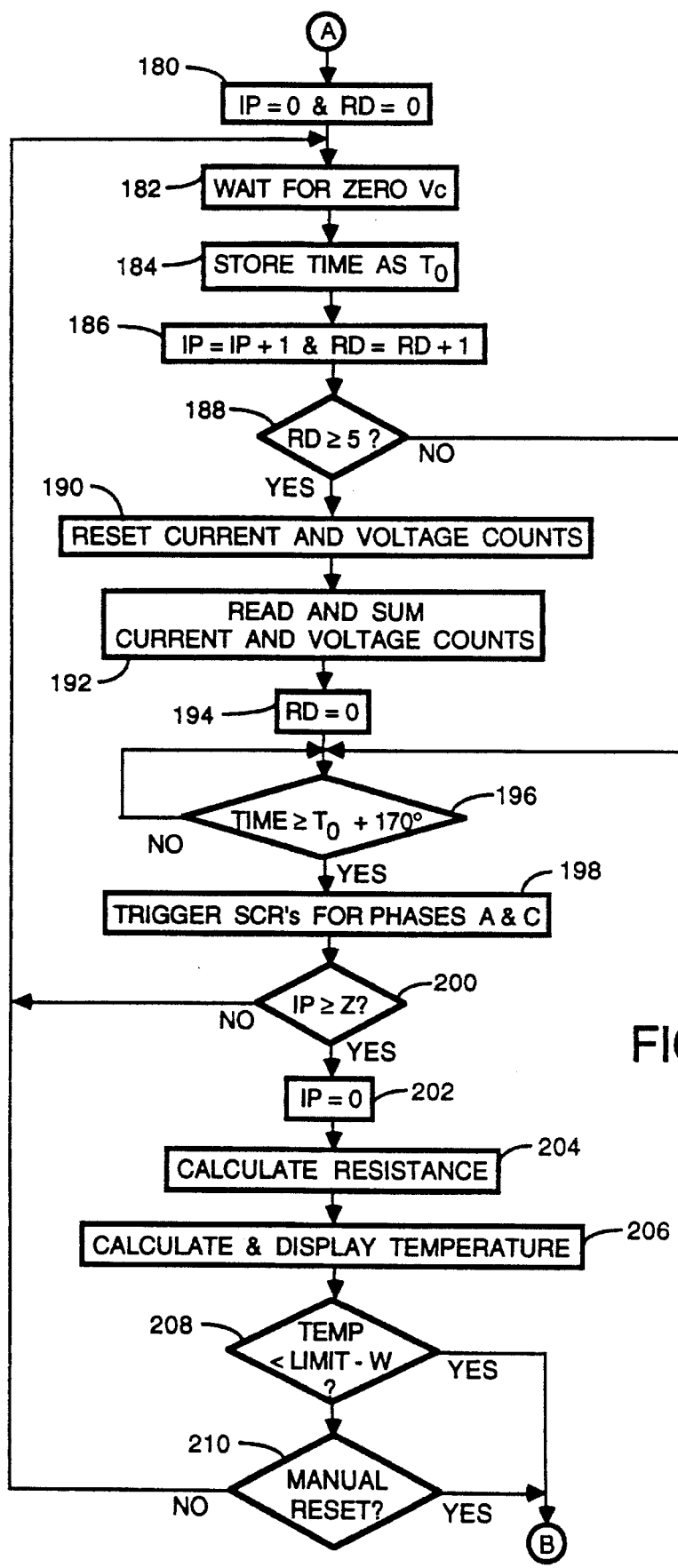

In the automated embodiment of the present invention, when a determination is made at step 170 that the :present temperature of the motor 10 exceeds its thermal limit, the program execution advances to step 180 on FIG. 2B and enters a section of the program that monitors the temperature of the motor to determine when normal operation can resume. At this time, the counter variables for the integration period (IP) and the counter read interval (RD) are initialized to zero. Then at step 182, the microcomputer 21 waits for an indication from the comparator 27 that the phase C voltage Vc has made a zero crossing. The time of that occurrence is stored as time $T_0$ at step 184 and the count of half-cycles of the integration period and the read interval are incremented at step 186. Next the microcomputer 21 checks the new value of variable RD to determine if it has reached a value Y which indicates that it is time to read the voltage and current counts. When it is the proper time, the program execution advances to step 190 at which the microcomputer reads the contents of the first and second latches 64 and 96 to obtain the present voltage and currents counts, respectively. The microcomputer 21 then adds the newly acquired counts to a running summation of the voltage and current counts during the present integration interval at step 192. The new sums for the current and voltage counts are stored within the microcomputer's memory. Next the count of half-cycles which occur during the read interval is initialized by setting the value of variable RD to zero at step 194.

The program then enters a section which determines whether it is the proper time during this half-cycle to fire the SCR's 16 and 18 for supply phases A and C. This section commences at step 196 where the present time as indicated by the microcomputer clock is compared to a value equivalent to 170 degrees of the AC supply cycle after time $T_0$ at which the phase C supply voltage made a zero crossing. The microcomputer's program execution remains at step 196 until this time occurs, at which point the SCR pairs 16 and 18 for the phase A and C supply lines are triggered at step 198. This action provides a phase delay of 170 degrees during each half-cycle at which to trigger the SCR's. This long phase delay, in addition to the triggering of only two of the pairs of SCR's, applies electricity to the motor in a manner which will allow the resistance of the third stator winding 13 to be measured without causing the motor to move. This application of electricity is also insufficient to raise the motor temperature, thereby enabling the motor to cool from its thermal overload condition.

After the SCR's have been triggered, a determination is made at step 200 whether the end of the integration period has occurred as indicated when the count of supply line half-cycles IP equals or exceeds the number of half-cycles Z which are to occur during the integration period. If it is not the end of the integration period, the program execution returns to step 182 to await another zero crossing of the phase C supply voltage. At the end of the integration period, the program execution advances to step 102 where the count IP of half-cycles during the integration period is reset to zero. Then at steps 102 and 106, the microcomputer 21 calculates the resistance of the third stator winding 13 and from that resistance calculates the temperature of the motor in a manner as previously described. The temperature is displayed to the operator on control panel 30. The newly calculated temperature is then compared at step 208 to a fixed temperature value that is well below the thermal limit of the motor. When the temperature drops to this lower value, the motor will have cooled sufficiently to enable normal operation to resume. If so, the program execution jumps to step 140 on FIG. 2A to commence triggering the SCR's in order to produce movement of the motor. If, however, the motor has not cooled to a point where operation can resume, the program execution branches from step 208 to step 210 where a determination is made whether the operator is pressing a manual reset button on control panel 30. If that manual reset is not occurring, the program execution returns to step 182 in order to continue monitoring the cooling of the motor 10. On the other hand, if the operator is manually resetting the motor controller 20, its program execution jumps to step 140 to resume operation of the motor.

In this manner, once a thermal overload occurs, the motor controller 20 continues to monitor the temperature of the motor after it has been shut off to determine when the motor has cooled to a temperature at which electricity can again be applied to operate the motor 10. If such automatic resumption of the motor operation is not desired, the continued monitoring of the motor can merely provide a temperature measurement which is displayed to the operator on control panel 30 and the operator determines from that display whether or not to manually restart the motor.

The invention being claimed is:

1. An apparatus for controlling an electric motor having three windings that are supplied by a three-phase source of alternating electricity wherein electricity in each phase changes polarity between alternating first and second half-cycles, said apparatus comprising:

first, second and third input terminals for connecting to the three-phase source of alternating electricity;

first, second and third output terminals for connecting to the three windings of the motor;

first, second and third thyristor switches, the first thyristor switch coupling said first input terminal to said first output terminal, the second thyristor switch coupling said second input terminal to said second output terminal, and the third thyristor switch coupling said third input terminal to said third output terminal;

a switch controller connected to trigger said three thyristor switches in order to apply electricity to said output terminals, wherein triggering of said first thyristor switch is delayed by a first phase angle delay after said first thyristor switch has become non-conductive in each one of a plurality of first half-cycles to produce a first non-conductive period during a portion of said each one of a plurality of first half-cycles, wherein triggering of said first thyristor switch is delayed by a second phase angle delay after said first thyristor switch has become non-conductive in each one of a plurality of second half-cycles to produce a second non-conductive period during a portion of said each one of a plurality of second half-cycles, in which said plurality of second half-cycles are interleaved with the plurality of first half-cycles, and wherein the first non-conductive period is longer in duration than the second non-conductive period;

a first sensor that produces a first signal indicating a magnitude of electric current flowing through said first output terminal;

a first integrator connected to said first sensor to integrate the first signal to provide a first value which represents a DC component of electric current flowing through said first output terminal;

a second sensor to produce a second signal indicating a magnitude of voltage across one motor winding connected to said first output terminal;

a second integrator connected to said second sensor to integrate the second signal to provide a second value which represents a DC component of voltage across the one motor winding;

a first mechanism connected to said first and second integrators to determine a resistance of the one motor winding from the first and second values;

a second mechanism operatively coupled to said first mechanism for determining a temperature of the motor from the resistance; and a third mechanism, responsive to the temperature determined by said second mechanism, to produce an indication when the temperature exceeds a predefined value;

wherein said switch controller responds to the indication from said third mechanism by altering the manner in which said first, second and third thyristor switches are triggered.

2. The apparatus as recited in claim 1 wherein said first integrator comprises:

a voltage-to-frequency converter having an input connected to said first sensor to receive the first signal, and having an first output; and a counter having an input connected to the first output to count cycles of a third signal produced by said voltage-to-frequency converter and produce a numerical count which indicates a magnitude of the DC component of electric current flowing through said first output terminal.

3. The apparatus as recited in claim 1 wherein said second sensor comprises:

three resistors with each resistor connected between a common node and one of said first, second and third output terminals; and means, connected to one of the resistors, for producing the second signal which has a voltage level which is proportional to the voltage across the one motor winding.

4. The apparatus as recited in claim 3 wherein said second integrator comprises:

a voltage-to-frequency converter having an input connected to said means for producing to receive the second signal and having an output; and a counter having an input connected to the output to count cycles of a third signal produced by said voltage-to-frequency converter, and produce a numerical count which indicates a DC component of voltage across the one of the motor windings.

5. A method of controlling an electric motor having three windings connected by three solid state switches to a three-phase source of electricity wherein electricity in each phase changes polarity between alternating first and second half-cycles, steps of said method comprising:

(a) triggering the three solid state switches to apply electricity from the three-phase source to the electric motor to produce rotation of the motor shaft, wherein triggering of one solid state switch is delayed by a first phase angle delay after said first thyristor switch has become non-conductive in each one of a plurality of first half-cycles to create a first non-conductive period during a portion of said each one of a plurality of first half-cycles, wherein triggering of said first thyristor switch is delayed by a second phase angle delay after said first thyristor switch has become non-conductive in each one of a plurality of second half-cycles to create a second non-conductive period during a portion of said each one of a plurality of second half-cycles, in which said plurality of second half-cycles are interleaved with the plurality of first half-cycles, and wherein the first non-conductive period is longer in duration than the second non-conductive period;

(b) sensing a DC component of electric current flowing through a motor winding that is connected to the one solid state switch and providing a first value indicative of a magnitude of the DC component of electric current;

(c) sensing a DC component of voltage across the motor winding that is connected to the one solid state switch and providing a second value indicative of a magnitude of the DC component of voltage;

(d) determining a resistance value $R_T$ from the first and second values;

(e) determining a temperature of the motor from the resistance value;

(f) repeating steps (a) through (e) to provide sufficient excitation of the motor windings to produce rotation of the motor shaft, while at the same time monitoring the temperature of the motor obtained in step (e), and if the temperature exceeds a thermal limit for the motor, then altering the triggering of the three solid state switches to apply a monitoring pulse of electric current through the motor winding that is connected to one solid state switch, in which said monitoring pulse is insufficient to produce rotation of the motor shaft thereby also allowing the motor to cool; and thereafter (g) repeating application of said monitoring pulse and steps (b) through (e) to continue determining the temperature of the motor during application of said monitoring pulse, and when the temperature drops below said thermal limit by a predetermined amount, then discontinuing application of the monitoring pulse and resuming to perform step (f) of providing sufficient excitation of the motor windings to produce rotation of the motor shaft and monitoring the temperature of the motor.

6. The method as recited in claim 5 wherein the step of sensing a DC component of electric current comprises sensing alternating electric current flowing through the motor winding to produce a signal which varies with changes in the alternating electric current and integrating the signal to produce a value representing the DC component.

7. The method as recited in claim 5 wherein the step of sensing a DC component of voltage across the motor winding comprises sensing alternating voltage across the motor winding to produce a signal which varies with changes in the voltage and integrating the signal to produce a value representing the DC component.

8. The method as recited in claim 5 wherein the step of determining a temperature (TEMP) of the motor solves the expression:

$$\text{TEMP} = \text{TEMP}_0 + \frac{1}{\alpha R_0} (R_T - R_0)$$

where $R_0$ is a reference stator winding resistance at a known temperature $\text{TEMP}_0$, and $\alpha$ is the temperature coefficient of resistance in degrees $C^{-1}$.

9. An apparatus for controlling an electric motor having three windings supplied by a three-phase source of electricity wherein electricity in each phase changes polarity between alternating first and second half-cycles, said apparatus comprising:

first, second and third switches, each of which coupling a phase of the source to a winding of the electric motor;

a switch controller connected to operate said first, second and third switches in order to apply electricity to produce movement of the motor, wherein said first switch is operated to be in a conductive state for a longer period of time during each one of a plurality of first half-cycles than during each one of a plurality of second half-cycles which are interleaved with the plurality of first half-cycles;

a first sensor is connected to said first switch and provides a first value that indicates a DC component of electric current flowing through one motor winding that is connected to said first switch;

a second sensor is connected across the motor and provides a second value that indicates a DC component of voltage across the one motor winding;

a first mechanism connected to said sensors for compensating said first and second values; and a second mechanism connected to said sensors for determining the resistance.

10. The apparatus as recited in claim 9, further including:

a third mechanism operatively connected to said second mechanism to determine a temperature of the motor from the resistance; and a fourth mechanism, responsive to the temperature determined by said third mechanism, to produce an indication when the temperature exceeds a predefined value.

11. The apparatus as recited in claim 10 wherein said switch controller includes a means that responds to the indication by interacting with said first, second and third switches to stop movement of the motor.

12. The apparatus as recited in claim 10 wherein said switch controller includes a means that responds to the indication by operating said first, second and third switches in a manner that applies pulses of electricity through the motor for monitoring purposes which pulses are insufficient to produce movement of the motor thereby also allowing the motor to cool; and further comprises a fifth mechanism, responsive to said third and fourth mechanisms, to determine when the temperature drops below a predetermined value after the temperature exceeded the predefined value; and wherein said switch controller responds to said fifth mechanism by operating said first, second and third switches to produce movement of the motor.

13. The apparatus as recited in claim 9 wherein said first sensor comprises:

a current sensor connected to said first switch and producing a first signal having a voltage level that corresponds to a magnitude of electric current flowing through the one motor winding;

a voltage-to-frequency converter having an input connected to said current sensor to receive the first signal, and having an first output; and a counter having an input connected to the first output to count cycles of a second signal produced by said voltage-to-frequency converter and producing a numerical count which indicates a magnitude of the DC component of electric current flowing through the one motor winding.

14. The apparatus as recited in claim 9 wherein said second sensor comprises:

three resistors with each resistor connected between a node and one of said first, second and third switches; and means, connected to one of said three resistors, for producing a first signal having a voltage level which is proportional to the voltage across the one motor winding.

15. The apparatus as recited in claim 14 wherein said second sensor further comprises:

a voltage-to-frequency converter having an input connected to said means for producing and having an first output; and a counter having an input connected to the first output to count cycles of a second signal produced by said voltage-to-frequency converter and producing a numerical count which indicates a magnitude of the DC component of voltage across the one motor winding.

16. In a motor control apparatus for determining the resistance of a winding within an alternating current electric motor by energizing the motor with asymmetrical voltage pulses to thereby introduce a DC component in the winding, by sensing the magnitude of the DC voltage and DC current resulting from the asymmetrical voltage pulses, and by computing the resistance of the winding based upon the sensed magnitude of the DC voltage and DC current, the improvement comprising:

means for operating the electric motor with symmetrical voltage pulses, without introducing a substantial DC component in the winding;

means for storing a DC voltage offset value and a DC current offset value, respectively obtained by reading the output of the sensing circuit while the motor is operated without a DC component;

means for producing a corrected DC voltage measurement value and a corrected DC current measurement value by subtracting the respective DC voltage offset value and DC current offset value from the raw DC voltage measurement value and the raw DC current measurement value when the motor is operated with a DC component introduced by energizing the motor with asymmetrical voltage pulses; and means for computing the resistance of the winding utilizing the corrected DC voltage measurement value and the corrected DC current measurement value to thereby increase the accuracy of the resistance value which is computed.

17. The improvement of claim 16 in which the DC voltage measurement value and the DC current measurement value each comprises a digital count which represents the respective sensed DC voltage and DC current, and the DC voltage offset value and the DC current offset value are each stored as a digital offset count.

\* \* \* \* \*

UNITED STATES PATENT AND TRADEMARK OFFICE
CERTIFICATE OF CORRECTION

PATENT NO. : 5,510,687
DATED      : Apr. 23, 1996
INVENTOR(S) : Unsworth et al.

It is certified that error appears in the above-indentified patent and that said Letters Patent is hereby corrected as shown below:

On the title page, item [75], after "Peter", delete --Ursworth-- and replace "Unsworth" therefore.

Signed and Sealed this

Twenty-eighth Day of July, 1998

Attest:

Attesting Officer

BRUCE LEHMAN

Commissioner of Patents and Trademarks